United States Patent
Palmer

(10) Patent No.: US 12,007,889 B2
(45) Date of Patent: Jun. 11, 2024

(54) VALID DATA IDENTIFICATION FOR GARBAGE COLLECTION

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/968,607

(22) Filed: Oct. 18, 2022

(65) Prior Publication Data

US 2023/0185713 A1    Jun. 15, 2023

Related U.S. Application Data

(62) Division of application No. 17/129,373, filed on Dec. 21, 2020, now Pat. No. 11,500,769.

(51) Int. Cl.
*G06F 12/02* (2006.01)
*G06F 12/0891* (2016.01)

(52) U.S. Cl.
CPC ...... *G06F 12/0292* (2013.01); *G06F 12/0253* (2013.01); *G06F 12/0891* (2013.01)

(58) Field of Classification Search
CPC ...... G06F 3/0604; G06F 3/064; G06F 3/0644; G06F 12/0253; G06F 12/0292; G06F 12/0891
See application file for complete search history.

(56) References Cited

U.S. PATENT DOCUMENTS

| | | | | |
|---|---|---|---|---|
| 7,340,581 | B2 * | 3/2008 | Gorobets | G06F 12/0246 711/202 |
| 2011/0072194 | A1 * | 3/2011 | Forhan | G06F 12/0246 711/170 |
| 2013/0151754 | A1 * | 6/2013 | Post | G06F 12/0246 711/E12.008 |
| 2014/0164730 | A1 * | 6/2014 | Gold | G06F 3/0683 711/171 |
| 2016/0232088 | A1 | 8/2016 | Mohan et al. | |
| 2019/0235762 | A1 | 8/2019 | Kaburaki et al. | |
| 2020/0409840 | A1 | 12/2020 | Pu et al. | |

* cited by examiner

*Primary Examiner* — Aracelis Ruiz
(74) *Attorney, Agent, or Firm* — Holland & Hart LLP

(57) ABSTRACT

Methods, systems, and devices for valid data identification for garbage collection are described. In connection with writing data to a block of memory cells, a memory system may identify a portion of a logical address space that includes a logical address for the data. The memory system may set a bit of a bitmap, which may indicate that the block includes data having a logical address within a portion of the logical address space corresponding to the bit. The logical address space may be divided into any quantity of portions, each corresponding to a different subset of a logical-to-physical (L2P) table, and the bitmap may include any quantity of corresponding bits. To perform garbage collection on the block, the bitmap may be used to identify one or more subsets of the L2P table to evaluate to determine whether different sets of data within the block are valid or invalid.

20 Claims, 6 Drawing Sheets

VALID DATA IDENTIFICATION FOR GARBAGE COLLECTION

CROSS REFERENCE

The present Application for Patent is a divisional of U.S. patent application Ser. No. 17/129,373 by Palmer, entitled "VALID DATA IDENTIFICATION FOR GARBAGE COLLECTION", filed Dec. 21, 2020, assigned to the assignee hereof, and is expressly incorporated by reference in its entirety herein.

FIELD OF TECHNOLOGY

The following relates generally to one or more systems for memory and more specifically to valid data identification for garbage collection.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
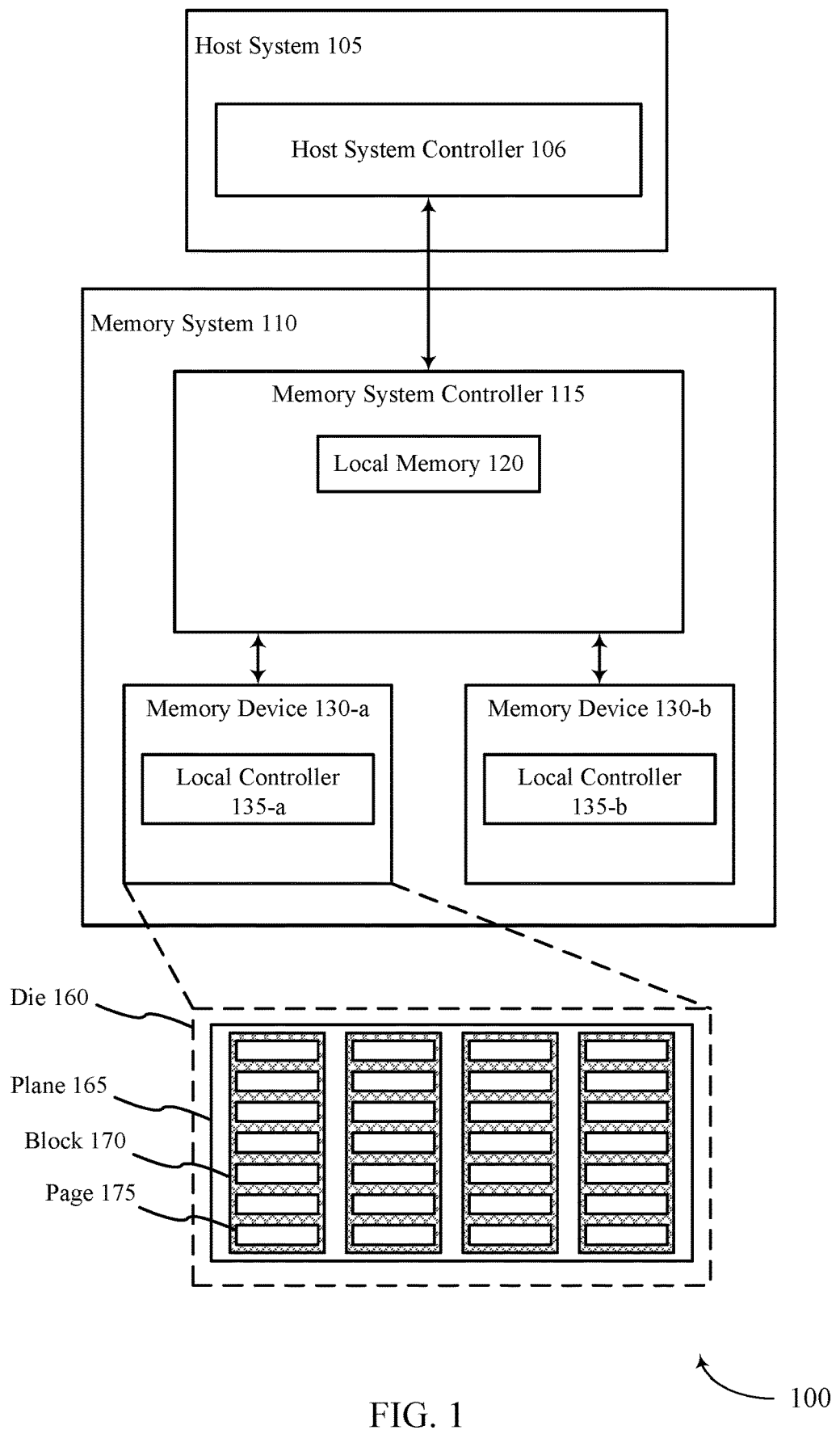
FIG. 1 illustrates an example of a system that supports valid data identification for garbage collection in accordance with examples as disclosed herein.

A memory system may be configured to store data within memory cells, where different groups of memory cells may have different physical addresses within a physical address space for the memory system. Different sets of data may be associated with different logical addresses within a logical address space, which may alternatively be referred to as a system address space or virtual address space, and which may be referenced by a host device in order to identify the different sets of data (e.g., read or write commands from the host device may indicate a corresponding set of data based on the logical address for the corresponding set of data). In some cases, a memory system may be organized as blocks of memory cells, and in some cases, a block of memory cells may be configured to store multiple sets of data each corresponding to a different logical block address (LBA) and stored within a different set of memory cells (e.g., a different group of memory cells within the block) having a corresponding physical block address (PBA).

A memory system may store and maintain a logical-to-physical (L2P) table indicating a mapping between the physical address space and a logical address space corresponding to the logical addresses. For example, the L2P table may indicate the physical address for the group of memory cells in which the data associated with each logical address is stored. The L2P table may additionally be used by the memory system to determine whether the data associated with a given physical address is valid. As used herein, an L2P table may refer to a single table or to multiple tables that collectively span a corresponding logical address space, a corresponding physical address space, or both.

In some cases, a memory system may perform one or more management (e.g., maintenance) operations to facilitate performance of the memory system. For example, the memory system may determine to perform a garbage collection operation on a block of memory cells. In connection with a garbage collection operation for a block of memory cells, the memory system may evaluate the L2P table to identify which of the sets of data stored by the block of memory cells are valid. The memory system may then store the valid data in a different block of memory cells and erase the data (e.g., the valid data and the invalid data) stored in the block of memory cells, which may make the block of memory cells available to store new data, for example.

In some cases, evaluating an entire L2P table to identify the valid data stored by a block of memory cells may be inefficient. For example, the L2P table may be relatively large, and evaluating the entire L2P table may take a correspondingly large amount of time. As described herein, however, a memory system may instead evaluate one or more subsets of the L2P table to identify the valid data stored by the memory cells. For example, the memory system may store a bitmap for each block of memory cells, where each bit of the bitmap corresponds to a respective subset of the L2P table and indicates whether that block of memory cells is storing any data associated with logical addresses within the portion of the logical address space that corresponds to the respective subset of the L2P table. Hence, the bitmap for a block of memory cells may indicate one or more subsets of the L2P table as being relevant to that block of memory cells. In this example, instead of evaluating the entire L2P table to identify the valid data stored by the block of memory cells, the memory system may evaluate the one or more subsets of the L2P table indicated by the bitmap. In some cases, this may increase an efficiency associated with garbage collection operations performed by the memory system (e.g., by reducing one or more related latencies. Additionally or alternatively, such techniques may allow an overhead associated with garbage collection operations performed by the memory system to be tunable (e.g., adjustable, configurable) based on configuring the size of the individual subsets of the L2P table (e.g., whether the L2P table is divided into relatively many small subsets, or relatively few large subsets), among other benefits that may be appreciated by one of ordinary skill in the art.

Features of the disclosure are initially described in the context of a system, a block diagram, and a flowchart as described with reference to FIGS. 1 through 3. These and other features of the disclosure are further illustrated by and described with reference to an apparatus diagram and flowcharts that relate to valid data identification for garbage collection as described with reference to FIGS. 4-6.

FIG. 1 illustrates an example of a system 100 that supports valid data identification for garbage collection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magnetic RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130a may include a local controller 135a and a memory device 130b may include a local controller 135b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 (e.g., a block of memory cells) may include a respective set of pages 175, and each page 175 may include a set of memory cells. Additionally, each page 175 may be configured to store a respective set of data associated with one or more logical addresses (e.g., within a logical address space referenced by or otherwise associated with a host system).

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update an L2P table (e.g., an L2P mapping table) to associate the logical address (e.g., LBA) for the data with the new, valid block 170 rather than the old, invalid block 170. In some cases, such copying and remapping may be preferable to erasing and rewriting the entire old block 170 due to latency or wearout considerations, for example. In some cases, one or more copies of an L2P table may be stored within the memory cells of the memory device 130 (e.g., within one or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

In some cases, evaluating an entire L2P table to identify the valid data stored by a block of memory cells (e.g., during a garbage collection operation) may be inefficient. For example, the L2P table may be relatively large, and evaluating the entire L2P table may take a correspondingly large amount of time. As described herein, however, the memory system 110 may instead evaluate one or more subsets of the L2P table to identify the valid data stored by the memory cells. For example, the memory system 110 may store a bitmap for each block 170 (e.g., within the block 170, within the local memory 120, at the local controller 135), where each bit of the bitmap corresponds to a respective subset of the L2P table and indicates whether that block 170 is storing any data associated with logical addresses within the portion of the logical address space that corresponds to the respective subset of the L2P table. Hence, the bitmap for a block 170 may indicate one or more subsets of the L2P table as being relevant to that block 170. In this example, instead of evaluating the entire L2P table to identify the valid data stored by the block 170, the memory system 110 may evaluate the one or more subsets of the L2P table indicated by the bitmap. In some cases, this may increase an efficiency associated with garbage collection operations performed by the memory system 110 (e.g., by reducing one or more related latencies. Additionally or alternatively, such techniques may allow an overhead associated with garbage collection operations performed by the memory system 110 to be tunable (e.g., adjustable, configurable) based on configuring the size of the individual subsets of the L2P table (e.g., whether the L2P table is divided into relatively many small subsets, or relatively few large subsets), among other benefits that may be appreciated by one of ordinary skill in the art.

The system 100 may include any quantity of non-transitory computer readable media that support valid data identification for garbage collection. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
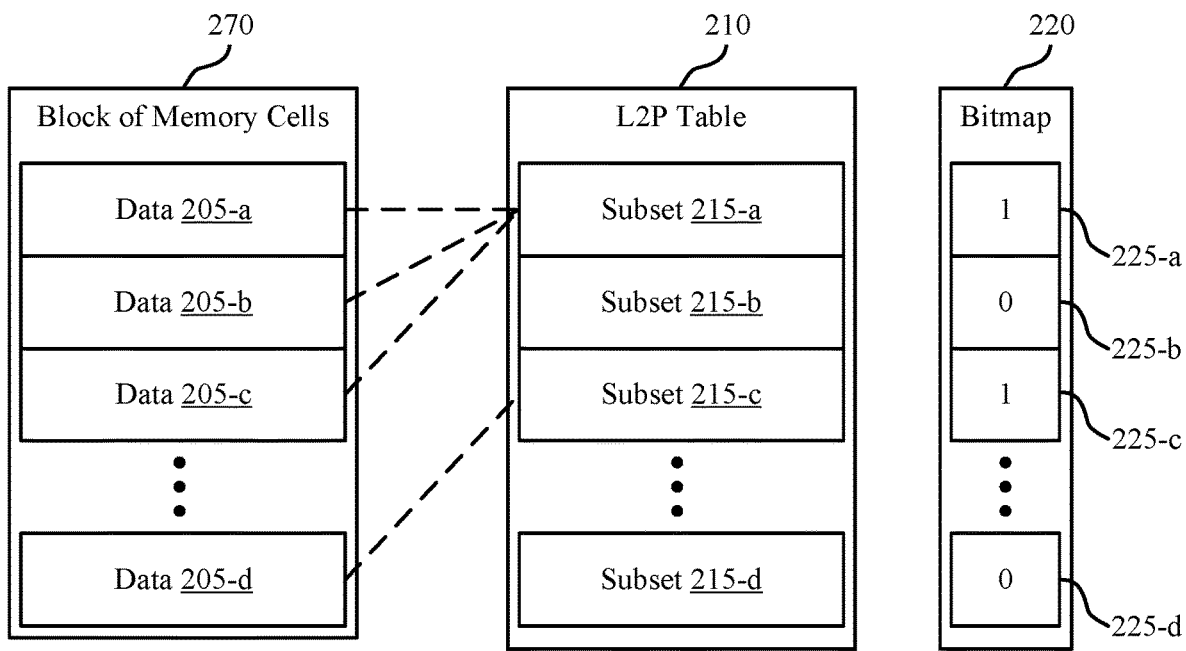
FIG. 2 illustrates an example of a block diagram that supports valid data identification for garbage collection in accordance with examples as disclosed herein.

FIG. 2 illustrates an example of a block diagram 200 that supports valid data identification for garbage collection in accordance with examples as disclosed herein. The block diagram 200 may implement aspects of the system as described with reference to FIG. 1. For example, a memory system, as described with reference to FIG. 1, may include the block of memory cells 270, the L2P table 210, and the bitmap 220. Additionally, the block of memory cells 270 may be an example of a block 170 as described with reference to FIG. 1. The block diagram 200 may illustrate an example relationship between data 205 stored at the block of memory cells 270, the L2P table 210, and the bitmap 220. In some cases, a memory system may include a bitmap 220 for each block of memory cells 270 of the memory system. Additionally, the memory system may refer to the same L2P table 210 for multiple (e.g., each) block of memory cells 270 of the memory system.

The block of memory cells 270 may store sets of data 205. In some cases, the block of memory cells 270 may include groups of memory cells (e.g., pages 175), each having a respective physical address (e.g., a PBA) and each configured to store a respective set of data 205 corresponding to one or more logical addresses (e.g., an LBA). For example, within the block of memory cells 270, a first group of memory cells may store data 205-*a* that corresponds to a first logical address, a second group of memory cells may store data 205-*b* that corresponds to a second logical address, a third group of memory cells may store data 205-c that corresponds to a third logical address, and a fourth group of memory cells may store data 205-d that corresponds to a fourth logical address. Although the block diagram 200 illustrates the block of memory cells 270 as storing sets of data 205 associated with four logical addresses, the block of memory cells 270 may be configured to store any quantity of sets of data 205 associated with any quantity of logical addresses (e.g., 64 logical addresses, 6000 logical addresses).

The L2P table 210 may indicate the mapping between the logical addresses (e.g., associated with a host system) and the physical addresses (e.g., associated with the pages of the block of memory cells 270). That is, the L2P table 210 may indicate, for each logical address, the physical address of the memory cells in which the data corresponding to the logical address is stored. For example, in some cases the L2P table 210 may be an ordered list of physical addresses (e.g., PBAs), where each position within the L2P table 210 corresponds to a respective logical address (e.g., LBA), and thus a physical address being listed in a particular position within the L2P table 210 indicates that data associated with the logical address corresponding to the position is stored at memory cells having the listed physical address.

The L2P table 210 may be partitioned into any quantity of subsets 215 (e.g., one or more portions, one or more regions). Each subset 215 of the L2P table 210 may include information associated with a corresponding portion (e.g., region) of the logical address space covered by the L2P table 210. For example, the subset 215-a may include information associated with a first set of logical addresses, the subset 215-b may include information associated with a second set of logical addresses, the subset 215-c may include information associated with a third set of logical addresses, and the subset 215-d may include information associated with a fourth set of logical addresses. In the example of block diagram 200, the subset 215-a of the L2P table 210 may include the logical addresses associated with the data 205-a, the data 205-b, and the data 205-c. Additionally, the subset 215-c of the L2P table 210 may include the logical address associated with the data 205-d. In some cases, the block of memory cells 270 may not include any data 205 associated with one or more subsets 215 of the L2P table 210 (e.g., in the example of FIG. 2, no data associated with subsets 215-b and 215-d is stored within the block of memory cells 270).

For each block of memory cells 270, a memory system may indicate a corresponding bitmap 220. For each subset 215 of the L2P table 210, the bitmap 220 may indicate whether the block of memory cells 270 includes any data 205 associated with the logical addresses covered by the subset 215. For example, the bitmap 220 may include a respective bit 225 associated with each subset 215 of the L2P table 210. For example, the bit 225-a may be associated with the subset 215-a, the bit 225-b may be associated with the subset 215-b, the bit 225-c may be associated with the subset 215-c, and the bit 225-d may be associated with the subset 215-d. The value of a bit 225 associated with a subset 215 may indicate whether the block of memory cells 270 includes any data 205 having logical addresses covered by (e.g., within a range of logical addresses associated with) the subset 215. For example, the bit 225-a of the bitmap 220 may store a value (e.g., a logic value '1') indicating that the subset 215-a of the L2P table 210 includes at least one logical address corresponding to data 205 stored in the block of memory cells. Conversely, for example, the bit 225-b may store a different value (e.g., a logic value '0') indicating that the subset 215-b of the L2P table 210 does not include logical addresses corresponding to any of the data 205 stored in the block of memory cells 270. In the example of block diagram 200, the block of memory cells 270 is storing data 205 corresponding to logical addresses within the subset 215-a and the subset 215-c. Thus, the bitmap 220 may include bits 225-a and 225-c indicating that the subsets 215-a and 215-c, respectively, of the L2P table 210 have logical addresses corresponding to data 205 stored by the block of memory cells 270. Additionally, the bits 225-b and 225-d may indicate that the subsets 215-b and 215-d, respectively, do not include logical addresses corresponding to data 205 stored in the block of memory cells 270.

In some cases, the memory system may update the L2P table 210 and the bitmap 220 in connection with writing data 205 to the block of memory cells 270. For example, in connection with storing data 205 in the block of memory cells 270, the memory system may update the L2P table 210 to indicate that the data 205 corresponding to a certain logical address is stored in memory cells having a certain physical address within the block of memory cells 270. For example, in connection with writing the data 205-c corresponding to a certain logical address to the block of memory cells 270, the memory system may update the L2P table 210 to indicate that the data 205-c corresponding to the certain logical address is stored within the third group of memory cells (e.g., third page 175) within the block of memory cells 270. Here, the logical address corresponding to the data 205-c may be within a range or other set of logical addresses associated with (e.g., mapped by, covered by) the subset 215-a of the L2P table 210. Accordingly, the memory system may update an entry within the subset 215-a of the L2P table 210 based on writing the data 205-c to the block of memory cells 270, where the updated entry may map the logical address (e.g. LBA) of data 205-c to the physical address (e.g. PBA) of the third group of memory cells (e.g., third page 175) within the block of memory cells 270.

Additionally or alternatively, in response to storing data 205 in the block of memory cells 270, the memory system may update the bitmap 220. For example, based on writing the data 205-c to the block of memory cells 270, the memory system may set the bit 225-a (e.g., corresponding to the subset 215-a of the L2P table 210) to a value indicating that the block of memory cells 270 is storing data 205-c corresponding to at least one logical address covered by the subset 215-a of the L2P table 210.

Figure 3:
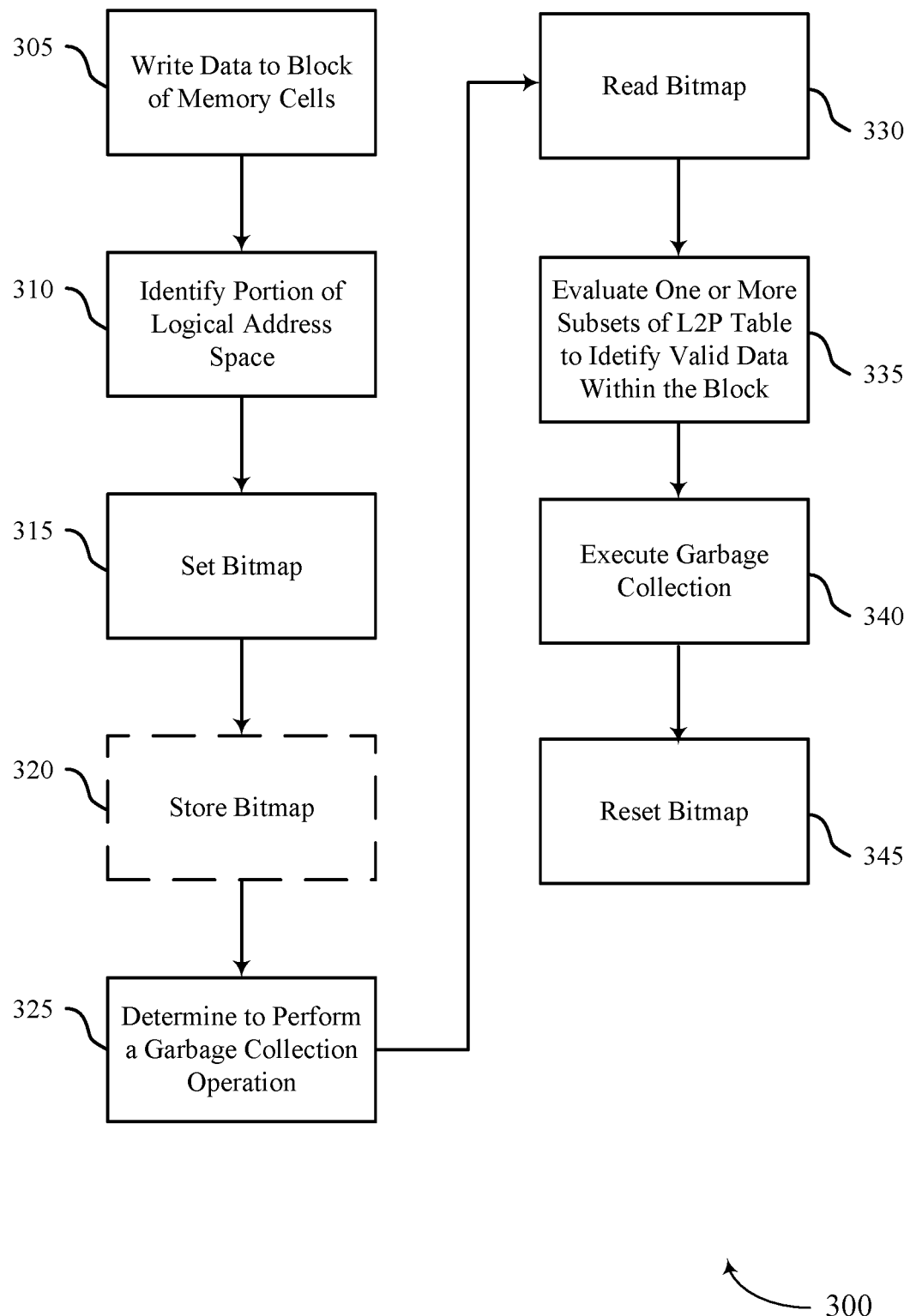
FIG. 3 illustrates an example of a process flow that supports valid data identification for garbage collection in accordance with examples as disclosed herein.

In response to determining to perform a garbage collection operation at the block of memory cells 270, the memory system may reference the bitmap 220 to identify one or more subsets 215 of the L2P table 210 to evaluate (e.g., in order to identify whether a given set of data 205 stored by the block of memory cells 270 is valid or invalid, as described in greater detail elsewhere herein, including with reference to FIG. 3). The memory system may identify the one or more subsets 215 to evaluate based on the values of the bits 225 of the bitmap 220. In the example of the block diagram 200, the memory system may determine to evaluate subset 215-a and subset 215-c based on the bitmap 220. That is, the bits 225-a and 225-c may indicate that the subsets 215-a and 215-c, respectively, each include at least one logical address corresponding to data 205 stored by the block of memory cells 270. Additionally, the bits 225-b and 225-d may indicate that the subsets 215-b and 215-d, respectively, do not include any logical addresses corresponding to data 205 stored by the block of memory cells 270. Thus, the memory system may evaluate the subsets 215-a and 215-c of the L2P table 210 and may refrain from evaluating the subsets 215-b and 215-d. Accordingly, the memory system may evaluate only a portion of the L2P table 210 (e.g. one or more subsets 215) in connection with performing garbage collection for the block of memory cells 270, which may provide latency benefits, efficiency benefits, or both, among other possible benefits.

The sizes of the subsets 215 may be configurable, either as part of the design of the memory system, or as a configurable parameter of the memory system that may be configured either post-manufacture (e.g., based on one or more fuse settings) or dynamically (e.g., during run-time or as part of any initialization procedure, such as by a host system for the memory system). Thus, different memory systems may utilize different sizes for the subsets 215 of the L2P table 210, or a same memory system may utilize different sizes for the subsets 215 of the L2P table 210 at different times. Further, in some cases, different subsets 215 may concurrently have different sizes even within the same memory system. For example, for a first block of memory cells 270, each subset 215 of the L2P table 210 may include information associated with a first quantity of logical addresses. Additionally, for a second block of memory cells 270, each subset 215 includes information associated with a second quantity of logical addresses (e.g., having a second size). As a size of the subsets 215 used for the L2P table 210 increases, the quantity of the subsets 215 associated with the L2P table 210 decreases. Additionally, as the size of the subsets 215 used for the L2P table 210 decreases, the quantity of subsets 215 increases.

Regardless of the size of the subsets 215 used for a block of memory cells 270, the memory system may use a bitmap 220 including a respective bit 225 for each of the subsets 215. Thus, the size of each bitmap 220 may be based on the quantity of subsets 215 used for the L2P table 210 for the corresponding block of memory cells 270. In some cases, a memory system may utilize a smaller subset size for blocks of memory cells 270 having SLCs (or other blocks of memory cells 270 associated with relatively higher speeds), and a larger subset size for blocks of memory cells 270 having MLCs, TLCs, or QLCs (or other blocks of memory cells 270 associated with relatively lower speeds). The configurable size for each of the subsets 215 may allow an overhead associated with garbage collection operations performed by the memory system to be tunable (e.g., adjustable, configurable) based on configuring the size of the individual subsets 215 of the L2P table 210 (e.g., whether the L2P table 210 is divided into relatively many small subsets 215, or relatively few large subsets 215), among other benefits that may be appreciated by one of ordinary skill in the art.

In some cases, a size of the subsets 215 may be fixed. That is, the size of the subsets 215 of each L2P table 210 within a memory system may be predefined or preconfigured. In some other cases, the size of each subset 215 may be dynamic. For example, a host system may signal, to the memory system, an updated size of the subsets 215 of an L2P table 210. Here, the memory system may invalidate the data 205 associated with the L2P table 210 to reconfigure the size of the subsets 215 of the L2P table 210. In some instances, the memory system may perform a garbage collection operation on the block of memory cells 270 associated with the L2P table 210 prior to reconfiguring the size of the subsets 215 (and consequently invalidating the data 205).

FIG. 3 illustrates an example of a flowchart 300 that supports valid data identification for garbage collection in accordance with examples as disclosed herein. The flowchart 300 may implement aspects of the systems as described with reference to FIGS. 1 and 2. For example, operations described by the flowchart 300 may be performed by a memory system as described with reference to FIGS. 1 and 2. The flowchart 300 may be implemented store data at the memory system and perform a garbage collection operation at the memory system. In the following description of the flowchart 300, the operations may be performed in different orders or at different times. Some operations may also be omitted from the flowchart 300, and other operations may be added to the flowchart 300.

At 305, data may be written (e.g., by the memory system) to a subset of a block of memory cells. For example, the memory system may receive a write command from the host system indicating the data. The memory system may then write the data to the block of memory cells according to the write command. The data may correspond to a logical address (e.g., within a logical address space associated with a host system) and may be stored at a physical address (e.g., associated with a group of memory cells within the block of memory cells, such as a page of memory cells). The memory system may update an L2P table indicating the mapping between the logical address and the physical address.

At 310, a portion of the logical address space that includes the logical address (e.g., corresponding to the data written to the subset of the block of memory cells) may be identified by the memory system based on writing the data to the group of memory cells within the block of memory cells. That is, the logical address space may be partitioned into one or more portions, each including one or more logical addresses. At 310, the memory system may identify which of the portions of the logical address space includes the logical address corresponding to the data written to the subset of the block of memory cells.

At 315, a bit of the bitmap may be set by the memory system based on identifying the portion of the logical address space. That is, each bit of the bitmap may correspond to a respective portion of the logical address space (which in turn may correspond to a respective subset 215 as described herein), and the memory system may set the bit of the bitmap to a value that indicates that the identified portion of the logical address space includes at least one logical address corresponding to data stored within the block of memory cells. In some cases, the bit may already be set to the value indicating that the identified portion of the logical address space includes at least one logical address corresponding to data stored within the block of memory cells. Here, the memory system may verify that the bit of the bitmap is set to that value rather than setting the bit of the bitmap.

At 320, the bitmap may be optionally stored at the block of memory cells. For example, in some cases the bitmap associated with the block of memory cells may be temporarily stored at a controller of the memory system (e.g., within local memory 120) until the block of memory cells is full. The memory system may determine that the block of memory cells is full based on a threshold quantity of the memory cells storing data (e.g., based on a threshold quantity of pages of the block having been programmed). Once the memory system determines that the block of memory cells is full, the memory system may write the bitmap associated with the block of memory cells to the block (e.g., to a page or other set of memory cells within the block). In another example, the memory system may write the bitmap associated with the block of memory cells to a different portion of the memory system (e.g., to a different block of memory cells).

At 325, a garbage collection operation may be determined to be performed (e.g., by the memory system) on the block of memory cells. For example, the memory system may determine to perform the garbage collection in response to a trigger (e.g., being idle for a threshold duration of time, a quantity of blocks of memory cells available for programming dropping to some threshold quantity, according to a certain periodicity). In some other cases, the memory system may receive a command (e.g., from the host system) to perform the garbage collection operation on the block of memory cells. At the time garbage collection is determined to be performed, the block of memory cells may be storing multiple sets of data, each corresponding to a respective logical address.

At 330, the bitmap may be read (e.g., by the memory system) to determine (e.g., identify) one or more subsets of an L2P table to evaluate in connection with the garbage collection operation. For example, the memory system may determine that the block of memory cells includes data from one or more portions of a logical address space based on corresponding bits of the bitmap being set to one logic value (e.g., a logic 1), and the memory system may determine that the block of memory cells does not include any data from one or other portions of the logical address space based on corresponding bits of the bitmap being set to another logic value (e.g., a logic 0).

At 335, each of the one or more subsets of the L2P table identified based on reading the bitmap may be evaluated by the memory system. The one or more evaluated subsets of the L2P table may be those indicated by the bitmap as corresponding to at least one set of data stored by the block of memory cells. In some cases, the memory system may additionally refrain from evaluating one or more other subsets of the L2P table. Here, the one or more other subsets of the L2P table may be those indicated by the bitmap as not corresponding to any data stored by the block of memory cells.

The logical addresses (e.g., from the set of logical addresses corresponding to the data stored by the block of memory cells) that correspond to valid data may be identified by the memory system based on evaluating the one or more subsets of the L2P table. For example, the L2P table (and thus the subsets thereof) may associate logical addresses with the corresponding physical addresses of the memory cells at which valid instances of the data are stored. Each time that data associated with a given logical address is updated (e.g., overwritten), the updated version of the data may be written to a new set of memory cells, and the L2P table may be updated to associate the logical address with the physical address of the new memory cells. The prior version of the data previously written to some other set of memory cells may be rendered invalid (e.g., outdated), and the L2P table may no longer associate the logical address with the physical address of the other set of memory cells. Accordingly, if the physical address for a set of memory cells within the block is listed within an evaluated subset of the L2P table, then the data stored by that set of memory cells may be identified as valid. And if the physical address for a set of memory cells within the block is not listed within any evaluated subset of the L2P table, then the data stored by that set of memory cells may be identified as invalid. This is of course just one example, and one of ordinary skill in the art may appreciate other techniques for determining whether the sets of memory cells within the block store valid versus invalid data based on evaluating the one or more subsets of the L2P table.

At 340, the garbage collection operation may be executed by the memory system based on identifying the logical addresses that correspond to valid data. To execute the garbage collection operation, the memory system may write (e.g., copy) the valid data (e.g., identified at 340) to memory cells within one or more other blocks of memory cells. The memory system may refrain from writing the invalid data to any other block of memory cells. The memory system may then erase the data from the block of memory cells.

At 350, the bitmap associated with the block of memory cells may be reset by the memory system based on executing the garbage collection operation. For example, the memory system may set each bit of the bitmap to a value indicating that no portions of the logical address space include logical addresses corresponding to data stored by the block of memory cells.

Figure 4:
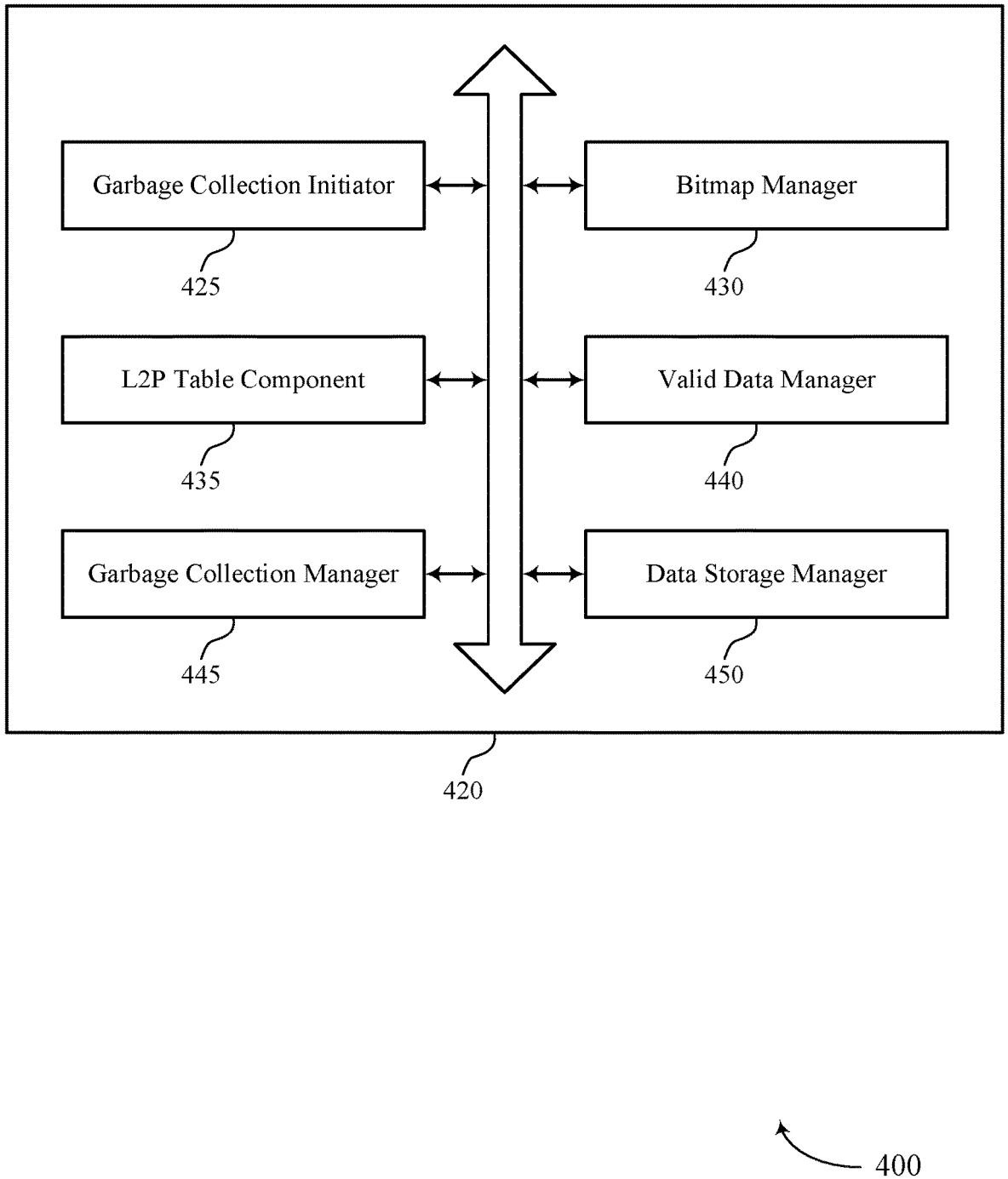
FIG. 4 shows a block diagram of a memory system that supports valid data identification for garbage collection in accordance with examples as disclosed herein.

FIG. 4 shows a block diagram 400 of a memory system 420 that supports valid data identification for garbage collection in accordance with examples as disclosed herein. The memory system 420 may be an example of aspects of a memory system as described with reference to FIGS. 1 through 3. The memory system 420, or various components thereof, may be an example of means for performing various aspects of valid data identification for garbage collection as described herein. For example, the memory system 420 may include a garbage collection initiator 425, a bitmap manager 430, a L2P table component 435, a valid data manager 440, a garbage collection manager 445, a data storage manager 450, or any combination thereof. Each of these components may communicate, directly or indirectly, with one another (e.g., via one or more buses).

The garbage collection initiator 425 may be configured as or otherwise support a means for determining to perform a garbage collection operation on a block of memory cells, where the block of memory cells stores data corresponding to a plurality of logical addresses within a logical address space. The bitmap manager 430 may be configured as or otherwise support a means for reading a bitmap for the block of memory cells, where each bit of the bitmap corresponds to a respective portion of the logical address space and indicates whether the respective portion of the logical address space includes one or more logical addresses within the plurality of logical addresses corresponding to the data. The L2P table component 435 may be configured as or otherwise support a means for evaluating a subset of an L2P table for the logical address space, the evaluating based at least in part on a bit of the bitmap indicating that at least one logical address within the plurality of logical addresses is within a portion of the logical address space corresponding to the subset of the L2P table. The valid data manager 440 may be configured as or otherwise support a means for identifying, based at least in part on evaluating the subset of the L2P table, which of the plurality of logical addresses correspond to valid data. The garbage collection manager 445 may be configured as or otherwise support a means for executing the garbage collection operation on the block of memory cells based at least in part on identifying which of the plurality of logical addresses correspond to valid data.

In some examples, the L2P table component 435 may be configured as or otherwise support a means for refraining from evaluating a second subset of the L2P table, the refraining based at least in part on a second bit of the bitmap indicating that the plurality of logical addresses are each outside of a second portion of the logical address space corresponding to the second subset of the L2P table.

In some examples, the L2P table component 435 may be configured as or otherwise support a means for identifying, based at least in part on an additional bit of the bitmap, that the plurality of logical addresses includes one or more logical addresses within an additional portion of the logical address space. In some examples, the L2P table component 435 may be configured as or otherwise support a means for evaluating a second subset of the L2P table that corresponds to the additional portion of the logical address space, where identifying which of the plurality of logical addresses correspond to valid data and executing the garbage collection operation on the block of memory cells are further based at least in part on evaluating the second subset of the L2P table.

In some examples, the additional portion of the logical address space corresponding to the second subset of the L2P table is discontinuous from the portion of the logical address space corresponding to the subset of the L2P table.

In some examples, the bitmap manager 430 may be configured as or otherwise support a means for resetting each bit of the bitmap based at least in part on executing the garbage collection operation.

In some examples, the data storage manager 450 may be configured as or otherwise support a means for writing, before determining to perform the garbage collection operation, a set of data to the block of memory cells, the set of data corresponding to one logical address of the plurality of logical addresses. In some examples, the L2P table component 435 may be configured as or otherwise support a means for identifying, based at least in part on writing the set of data to the block of memory cells, the portion of the logical address space as including the one logical address. In some examples, the bitmap manager 430 may be configured as or otherwise support a means for setting the bit of the bitmap based at least in part on identifying the portion of the logical address space as including the one logical address, where the bit of the bitmap being set indicates that at least one logical address within the plurality of logical addresses is within the portion of the logical address space, and where reading the bitmap includes identifying that the bit of the bitmap is set.

In some examples, to support executing the garbage collection operation, the garbage collection manager 445 may be configured as or otherwise support a means for storing the valid data corresponding to one or more of the plurality of logical addresses within one or more other blocks of memory cells different than the block of memory cells. In some examples, to support executing the garbage collection operation, the garbage collection manager 445 may be configured as or otherwise support a means for erasing data corresponding to the plurality of logical addresses from the block of memory cells based at least in part on storing the valid data to the one or more other blocks of memory cells.

In some examples, the bitmap is stored within a controller of the memory system. In some cases, the bitmap is stored within the block of memory cells.

The data storage manager 450 may be configured as or otherwise support a means for writing a set of data to a subset of a block of memory cells, the set of data corresponding to a logical address within a logical address space. In some examples, the L2P table component 435 may be configured as or otherwise support a means for identifying, based at least in part on writing the set of data to the subset of the block of memory cells, a portion of the logical address space that includes the logical address. In some examples, the bitmap manager 430 may be configured as or otherwise support a means for setting a bit of a bitmap based at least in part on the identifying, where each bit of the bitmap corresponds to a respective portion of the logical address space, and where the bit of the bitmap set indicates that data corresponding to at least one logical address within the respective portion of the logical address space that corresponds to the bit is stored within the block of memory cells.

In some examples, the data storage manager 450 may be configured as or otherwise support a means for writing a second set of data to a second subset of the block of memory cells, the second set of data corresponding to a second logical address within the logical address space. In some examples, the L2P table component 435 may be configured as or otherwise support a means for identifying, based at least in part on writing the second set of data to the second subset of the block of memory cells, a second portion of the logical address space that includes the second logical address. In some examples, the bitmap manager 430 may be configured as or otherwise support a means for setting a second bit of the bitmap based at least in part on the identifying, where the second bit being set indicates that data corresponding to at least one logical address within the second portion of the logical address space is stored within the block of memory cells.

In some examples, the second portion of the logical address space is discontinuous from the respective portion of the logical address space.

In some examples, the data storage manager 450 may be configured as or otherwise support a means for writing a third set of data to a third subset of the block of memory cells, the third set of data corresponding to a third logical address within the logical address space. In some examples, the L2P table component 435 may be configured as or otherwise support a means for identifying, based at least in part on writing the third set of data to the third subset of the block of memory cells, that the third logical address is within the respective portion of the logical address space. In some examples, the bitmap manager 430 may be configured as or otherwise support a means for ensuring, based at least in part on identifying that the third logical address is within the respective portion of the logical address space, that the bit is set.

In some examples, the data storage manager 450 may be configured as or otherwise support a means for determining, based at least in part on writing the set of data to the block of memory cells, that a threshold quantity of memory cells of the block of memory cells are storing data. In some examples, the bitmap manager 430 may be configured as or otherwise support a means for transferring the bitmap from a controller of the memory system to a second subset of the block of memory cells based at least in part on the determining.

In some examples, the garbage collection initiator 425 may be configured as or otherwise support a means for determining, after setting the bit of the bitmap, to perform a garbage collection operation on the block of memory cells, where the block of memory cells stores data corresponding to a plurality of logical addresses within the logical address space. In some examples, the bitmap manager 430 may be configured as or otherwise support a means for reading the bitmap to determine whether one or more logical addresses within the plurality of logical addresses is within the respective portion of the logical address space. In some examples, the L2P table component 435 may be configured as or otherwise support a means for evaluating a subset of an L2P table for the logical address space, the subset of the L2P table corresponding to the respective portion of the logical address space, and the evaluating based at least in part on the bit of the bitmap indicating that at least one logical address within the respective portion of the logical address space is stored within the block of memory cells. In some examples, the valid data manager 440 may be configured as or otherwise support a means for identifying, based at least in part on the subset of the L2P table, which of the plurality of logical addresses correspond to valid data. In some examples, the garbage collection manager 445 may be configured as or otherwise support a means for executing the garbage collection operation on the block of memory cells based at least in part on identifying which of the plurality of logical addresses correspond to valid data.

In some examples, to support setting the bit of the bitmap, the bitmap manager 430 may be configured as or otherwise support a means for setting the bit of the bitmap to a first value, where the bit of the bitmap having the first value indicates that at least one logical address within the respective portion of the logical address space is stored within the block of memory cells, and where the bit of the bitmap having a second value indicates that no logical address within the respective portion of the logical address space is stored within the block of memory cells.

Figure 5:
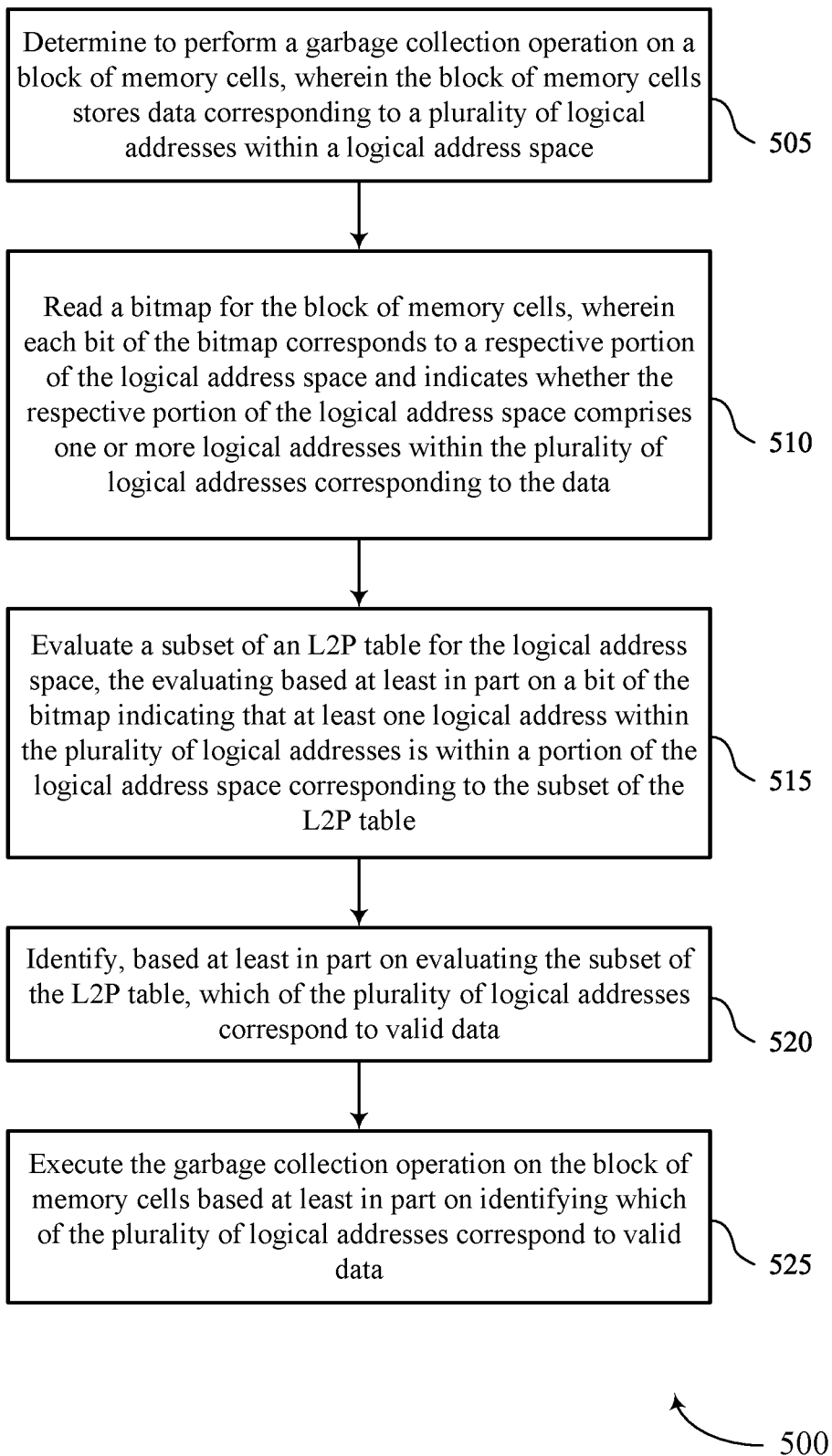
FIGS. 5 and 6 show flowcharts illustrating a method or methods that support valid data identification for garbage collection in accordance with examples as disclosed herein.

FIG. 5 shows a flowchart illustrating a method 500 that supports valid data identification for garbage collection in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include determining to perform a garbage collection operation on a block of memory cells, where the block of memory cells stores data corresponding to a plurality of logical addresses within a logical address space. The operations of 505 may be performed in accordance with examples as disclosed herein. In some examples, aspects of the operations of 505 may be performed by a garbage collection initiator 425 as described with reference to FIG. 4.

At 510, the method may include reading a bitmap for the block of memory cells, where each bit of the bitmap corresponds to a respective portion of the logical address space and indicates whether the respective portion of the logical address space includes one or more logical addresses within the plurality of logical addresses corresponding to the data. The operations of 510 may be performed in accordance with examples as disclosed herein. In some examples, aspects of the operations of 510 may be performed by a bitmap manager 430 as described with reference to FIG. 4.

At 515, the method may include evaluating a subset of an L2P table for the logical address space, the evaluating based at least in part on a bit of the bitmap indicating that at least one logical address within the plurality of logical addresses is within a portion of the logical address space corresponding to the subset of the L2P table. The operations of 515 may be performed in accordance with examples as disclosed herein. In some examples, aspects of the operations of 515 may be performed by a L2P table component 435 as described with reference to FIG. 4.

At 520, the method may include identifying, based at least in part on evaluating the subset of the L2P table, which of the plurality of logical addresses correspond to valid data. The operations of 520 may be performed in accordance with examples as disclosed herein. In some examples, aspects of the operations of 520 may be performed by a valid data manager 440 as described with reference to FIG. 4.

At 525, the method may include executing the garbage collection operation on the block of memory cells based at least in part on identifying which of the plurality of logical addresses correspond to valid data. The operations of 525 may be performed in accordance with examples as disclosed herein. In some examples, aspects of the operations of 525 may be performed by a garbage collection manager 445 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for determining to perform a garbage collection operation on a block of memory cells, where the block of memory cells stores data corresponding to a plurality of logical addresses within a logical address space, reading a bitmap for the block of memory cells, where each bit of the bitmap corresponds to a respective portion of the logical address space and indicates whether the respective portion of the logical address space includes one or more logical addresses within the plurality of logical addresses corresponding to the data, evaluating a subset of an L2P table for the logical address space, the evaluating based at least in part on a bit of the bitmap indicating that at least one logical address within the plurality of logical addresses is within a portion of the logical address space corresponding to the subset of the L2P table, identifying, based at least in part on evaluating the subset of the L2P table, which of the plurality of logical addresses correspond to valid data, and executing the garbage collection operation on the block of memory cells based at least in part on identifying which of the plurality of logical addresses correspond to valid data.

Some examples of the method 500 and the apparatus described herein may further include operations, features, circuitry, logic, means, or instructions for refraining from evaluating a second subset of the L2P table, the refraining based at least in part on a second bit of the bitmap indicating that the plurality of logical addresses may be each outside of a second portion of the logical address space corresponding to the second subset of the L2P table.

Some examples of the method 500 and the apparatus described herein may further include operations, features, circuitry, logic, means, or instructions for identifying, based at least in part on an additional bit of the bitmap, that the plurality of logical addresses includes one or more logical addresses within an additional portion of the logical address space, and evaluating a second subset of the L2P table that corresponds to the additional portion of the logical address space, where identifying which of the plurality of logical addresses correspond to valid data and executing the garbage collection operation on the block of memory cells may be further based at least in part on evaluating the second subset of the L2P table.

In some examples of the method 500 and the apparatus described herein, the additional portion of the logical address space corresponding to the second subset of the L2P table may be discontinuous from the portion of the logical address space corresponding to the subset of the L2P table.

Some examples of the method 500 and the apparatus described herein may further include operations, features, circuitry, logic, means, or instructions for resetting each bit of the bitmap based at least in part on executing the garbage collection operation.

Some examples of the method 500 and the apparatus described herein may further include operations, features, circuitry, logic, means, or instructions for writing, before determining to perform the garbage collection operation, a set of data to the block of memory cells, the set of data corresponding to one logical address of the plurality of logical addresses, identifying, based at least in part on writing the set of data to the block of memory cells, the portion of the logical address space as including the one logical address, and setting the bit of the bitmap based at least in part on identifying the portion of the logical address space as including the one logical address, where the bit of the bitmap being set indicates that at least one logical address within the plurality of logical addresses may be within the portion of the logical address space, and where reading the bitmap includes identifying that the bit of the bitmap is set.

In some examples of the method 500 and the apparatus described herein, operations, features, circuitry, logic, means, or instructions for executing the garbage collection operation may include operations, features, circuitry, logic, means, or instructions for storing the valid data corresponding to one or more of the plurality of logical addresses within one or more other blocks of memory cells different than the block of memory cells and erasing data corresponding to the plurality of logical addresses from the block of memory cells based at least in part on storing the valid data to the one or more other blocks of memory cells.

In some examples of the method 500 and the apparatus described herein, the bitmap may be stored within a controller of the memory system.

In some examples of the method 500 and the apparatus described herein, the bitmap may be stored within the block of memory cells.

Figure 6:
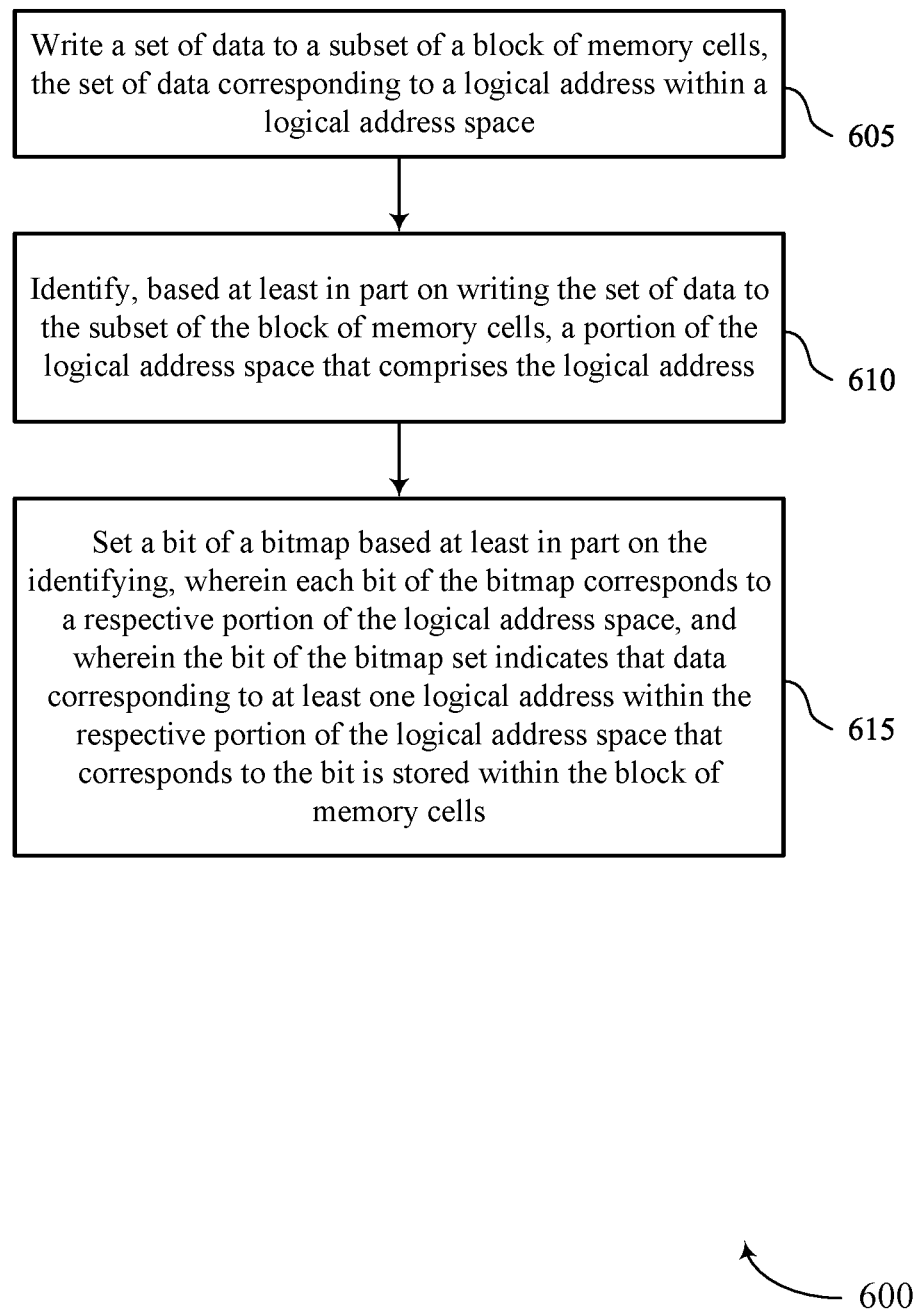

FIG. 6 shows a flowchart illustrating a method 600 that supports valid data identification for garbage collection in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 605, the method may include writing a set of data to a subset of a block of memory cells, the set of data corresponding to a logical address within a logical address space. The operations of 605 may be performed in accordance with examples as disclosed herein. In some examples, aspects of the operations of 605 may be performed by a data storage manager 450 as described with reference to FIG. 4.

At 610, the method may include identifying, based at least in part on writing the set of data to the subset of the block of memory cells, a portion of the logical address space that includes the logical address. The operations of 610 may be performed in accordance with examples as disclosed herein. In some examples, aspects of the operations of 610 may be performed by a L2P table component 435 as described with reference to FIG. 4.

At 615, the method may include setting a bit of a bitmap based at least in part on the identifying, where each bit of the bitmap corresponds to a respective portion of the logical address space, and where the bit of the bitmap set indicates that data corresponding to at least one logical address within the respective portion of the logical address space that corresponds to the bit is stored within the block of memory cells. The operations of 615 may be performed in accordance with examples as disclosed herein. In some examples, aspects of the operations of 615 may be performed by a bitmap manager 430 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for writing a set of data to a subset of a block of memory cells, the set of data corresponding to a logical address within a logical address space, identifying, based at least in part on writing the set of data to the subset of the block of memory cells, a portion of the logical address space that includes the logical address, and setting a bit of a bitmap based at least in part on the identifying, where each bit of the bitmap corresponds to a respective portion of the logical address space, and where the bit of the bitmap set indicates that data corresponding to at least one logical address within the respective portion of the logical address space that corresponds to the bit is stored within the block of memory cells.

Some examples of the method 600 and the apparatus described herein may further include operations, features, circuitry, logic, means, or instructions for writing a second set of data to a second subset of the block of memory cells, the second set of data corresponding to a second logical address within the logical address space, identifying, based at least in part on writing the second set of data to the second subset of the block of memory cells, a second portion of the logical address space that includes the second logical address, and setting a second bit of the bitmap based at least in part on the identifying, where the second bit being set indicates that data corresponding to at least one logical address within the second portion of the logical address space is stored within the block of memory cells.

In some examples of the method 600 and the apparatus described herein, the second portion of the logical address space may be discontinuous from the respective portion of the logical address space.

Some examples of the method 600 and the apparatus described herein may further include operations, features, circuitry, logic, means, or instructions for writing a third set of data to a third subset of the block of memory cells, the third set of data corresponding to a third logical address within the logical address space, identifying, based at least in part on writing the third set of data to the third subset of the block of memory cells, that the third logical address may be within the respective portion of the logical address space, and ensuring, based at least in part on identifying that the third logical address may be within the respective portion of the logical address space, that the bit is set.

Some examples of the method 600 and the apparatus described herein may further include operations, features, circuitry, logic, means, or instructions for determining, based at least in part on writing the set of data to the block of memory cells, that a threshold quantity of memory cells of the block of memory cells may be storing data, and transferring the bitmap from a controller of the memory system to a second subset of the block of memory cells based at least in part on the determining.

Some examples of the method 600 and the apparatus described herein may further include operations, features, circuitry, logic, means, or instructions for determining, after setting the bit of the bitmap, to perform a garbage collection operation on the block of memory cells, where the block of memory cells stores data corresponding to a plurality of logical addresses within the logical address space, reading the bitmap to determine whether one or more logical addresses within the plurality of logical addresses may be within the respective portion of the logical address space, evaluating a subset of an L2P table for the logical address space, the subset of the L2P table corresponding to the respective portion of the logical address space, and the evaluating based at least in part on the bit of the bitmap indicating that at least one logical address within the respective portion of the logical address space is stored within the block of memory cells, identifying, based at least in part on the subset of the L2P table, which of the plurality of logical addresses correspond to valid data, and executing the garbage collection operation on the block of memory cells based at least in part on identifying which of the plurality of logical addresses correspond to valid data.

In some examples of the method 600 and the apparatus described herein, operations, features, circuitry, logic, means, or instructions for setting the bit of the bitmap may include operations, features, circuitry, logic, means, or instructions for setting the bit of the bitmap to a first value, where the bit of the bitmap having the first value indicates that at least one logical address within the respective portion of the logical address space is stored within the block of memory cells, and where the bit of the bitmap having a second value indicates that no logical address within the respective portion of the logical address space is stored within the block of memory cells.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

If used to describe a conditional action or process, the terms "if," "when," "based on," "based at least in part on," and "in response to" may be interchangeable.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A non-transitory computer-readable medium storing code comprising instructions which, when executed by a processor of an electronic device, cause the electronic device to:

write a set of data to a subset of a block of memory cells of a memory system, the set of data corresponding to a logical address within a logical address space;

identify, based at least in part on writing the set of data to the subset of the block of memory cells, a portion of the logical address space that comprises a plurality of logical addresses including the logical address of the set of data; and set a bit of a bitmap based at least in part on the identifying, wherein each bit of the bitmap corresponds to a respective portion of the logical address space, and wherein the bit of the bitmap indicates that data stored within the block of memory cells corresponds to at least one logical address within the respective portion of the logical address space.

2. The non-transitory computer-readable medium of claim 1, wherein the instructions, when executed by the processor of the electronic device, further cause the electronic device to:

write a second set of data to a second subset of the block of memory cells, the second set of data corresponding to a second logical address within the logical address space;

identify, based at least in part on writing the second set of data to the second subset of the block of memory cells, a second portion of the logical address space that comprises the second logical address; and set a second bit of the bitmap based at least in part on the identifying, wherein the second bit being set indicates that data corresponding to at least one logical address within the second portion of the logical address space is stored within the block of memory cells.

3. The non-transitory computer-readable medium of claim 2, wherein the second portion of the logical address space is discontinuous from the respective portion of the logical address space.

4. The non-transitory computer-readable medium of claim 1, wherein the instructions, when executed by the processor of the electronic device, further cause the electronic device to:

write a third set of data to a third subset of the block of memory cells, the third set of data corresponding to a third logical address within the logical address space;

identify, based at least in part on writing the third set of data to the third subset of the block of memory cells, that the third logical address is within the respective portion of the logical address space; and ensure, based at least in part on identifying that the third logical address is within the respective portion of the logical address space, that the bit is set.

5. The non-transitory computer-readable medium of claim 1, wherein the instructions, when executed by the processor of the electronic device, further cause the electronic device to:

determine, based at least in part on writing the set of data to the block of memory cells, that a threshold quantity of memory cells of the block of memory cells are storing data; and transfer the bitmap from a controller of the memory system to a second subset of the block of memory cells based at least in part on the determining.

6. The non-transitory computer-readable medium of claim 1, wherein the instructions, when executed by the processor of the electronic device, further cause the electronic device to:

determine, after setting the bit of the bitmap, to perform a garbage collection operation on the block of memory cells, wherein the block of memory cells stores data corresponding to a plurality of logical addresses within the logical address space;

read the bitmap to determine whether one or more logical addresses within the plurality of logical addresses is within the respective portion of the logical address space;

evaluate a subset of a logical-to-physical (L2P) table for the logical address space, the subset of the L2P table corresponding to the respective portion of the logical address space, and the evaluating based at least in part on the bit of the bitmap indicating that the at least one logical address within the respective portion of the logical address space is stored within the block of memory cells;

identify, based at least in part on the subset of the L2P table, which of the plurality of logical addresses correspond to valid data; and execute the garbage collection operation on the block of memory cells based at least in part on identifying which of the plurality of logical addresses correspond to valid data.

7. The non-transitory computer-readable medium of claim 1, wherein the instructions to set the bit of the bitmap, when executed by the processor of the electronic device, cause the electronic device to:

set the bit of the bitmap to a first value, wherein the bit of the bitmap having the first value indicates that the at least one logical address within the respective portion of the logical address space is stored within the block of memory cells, and wherein the bit of the bitmap having a second value indicates that no logical address within the respective portion of the logical address space is stored within the block of memory cells.

8. An apparatus, comprising:
a memory array; and
a controller coupled with the memory array and configured to cause the apparatus to:

write a set of data to a subset of a block of memory cells within the memory array, the set of data corresponding to a logical address within a logical address space;

identify, based at least in part on writing the set of data to the subset of the block of memory cells, a portion of the logical address space that comprises a plurality of logical addresses including the logical address of the set of data; and set a bit of a bitmap based at least in part on the identifying, wherein each bit of the bitmap corresponds to a respective portion of the logical address space, and wherein the bit of the bitmap indicates that data stored within the block of memory cells corresponds to at least one logical address within the respective portion of the logical address space.

9. The apparatus of claim 8, wherein the controller is further configured to cause the apparatus to:

write a second set of data to a second subset of the block of memory cells, the second set of data corresponding to a second logical address within the logical address space;

identify, based at least in part on writing the second set of data to the second subset of the block of memory cells, a second portion of the logical address space that comprises the second logical address; and set a second bit of the bitmap based at least in part on the identifying, wherein the second bit being set indicates that data corresponding to at least one logical address within the second portion of the logical address space is stored within the block of memory cells.

10. The apparatus of claim 9, wherein the second portion of the logical address space is discontinuous from the respective portion of the logical address space.

11. The apparatus of claim 8, wherein the controller is further configured to cause the apparatus to:

write a third set of data to a third subset of the block of memory cells, the third set of data corresponding to a third logical address within the logical address space;

identify, based at least in part on writing the third set of data to the third subset of the block of memory cells, that the third logical address is within the respective portion of the logical address space; and ensure, based at least in part on identifying that the third logical address is within the respective portion of the logical address space, that the bit is set.

12. The apparatus of claim 8, wherein the controller is further configured to cause the apparatus to:

determine, based at least in part on writing the set of data to the block of memory cells, that a threshold quantity of memory cells of the block of memory cells are storing data; and transfer the bitmap from memory included in the controller to a second subset of the block of memory cells based at least in part on the determining.

13. The apparatus of claim 8, wherein the controller is further configured to cause the apparatus to:

determine, after setting the bit of the bitmap, to perform a garbage collection operation on the block of memory cells, wherein the block of memory cells stores data corresponding to a plurality of logical addresses within the logical address space;

read the bitmap to determine whether one or more logical addresses within the plurality of logical addresses is within the respective portion of the logical address space;

evaluate a subset of a logical-to-physical (L2P) table for the logical address space, the subset of the L2P table corresponding to the respective portion of the logical address space, and the evaluating based at least in part on the bit of the bitmap indicating that the at least one logical address within the respective portion of the logical address space is stored within the block of memory cells;

identify, based at least in part on the subset of the L2P table, which of the plurality of logical addresses correspond to valid data; and execute the garbage collection operation on the block of memory cells based at least in part on identifying which of the plurality of logical addresses correspond to valid data.

14. A method, comprising:

writing a set of data to a subset of a block of memory cells of a memory system, the set of data corresponding to a logical address within a logical address space;

identifying, based at least in part on writing the set of data to the subset of the block of memory cells, a portion of the logical address space that comprises a plurality of logical addresses including the logical address of the set of data; and setting a bit of a bitmap based at least in part on the identifying, wherein each bit of the bitmap corresponds to a respective portion of the logical address space, and wherein the bit of the bitmap indicates that data stored within the block of memory cells corresponds to at least one logical address within the respective portion of the logical address space.

15. The method of claim 14, wherein:

write a second set of data to a second subset of the block of memory cells, the second set of data corresponding to a second logical address within the logical address space;

identify, based at least in part on writing the second set of data to the second subset of the block of memory cells, a second portion of the logical address space that comprises the second logical address; and set a second bit of the bitmap based at least in part on the identifying, wherein the second bit being set indicates that data corresponding to at least one logical address within the second portion of the logical address space is stored within the block of memory cells.

16. The method of claim 15, wherein the second portion of the logical address space is discontinuous from the respective portion of the logical address space.

17. The method of claim 14, wherein:

write a third set of data to a third subset of the block of memory cells, the third set of data corresponding to a third logical address within the logical address space;

identify, based at least in part on writing the third set of data to the third subset of the block of memory cells, that the third logical address is within the respective portion of the logical address space; and ensure, based at least in part on identifying that the third logical address is within the respective portion of the logical address space, that the bit is set.

18. The method of claim 14, wherein:

determine, based at least in part on writing the set of data to the block of memory cells, that a threshold quantity of memory cells of the block of memory cells are storing data; and transfer the bitmap from a controller of the memory system to a second subset of the block of memory cells based at least in part on the determining.

19. The method of claim 14, wherein:

determine, after setting the bit of the bitmap, to perform a garbage collection operation on the block of memory cells, wherein the block of memory cells stores data corresponding to a plurality of logical addresses within the logical address space;

read the bitmap to determine whether one or more logical addresses within the plurality of logical addresses is within the respective portion of the logical address space;

evaluate a subset of a logical-to-physical (L2P) table for the logical address space, the subset of the L2P table corresponding to the respective portion of the logical address space, and the evaluating based at least in part on the bit of the bitmap indicating that the at least one logical address within the respective portion of the logical address space is stored within the block of memory cells;

identify, based at least in part on the subset of the L2P table, which of the plurality of logical addresses correspond to valid data; and execute the garbage collection operation on the block of memory cells based at least in part on identifying which of the plurality of logical addresses correspond to valid data.

20. The method of claim 14, wherein set the bit of the bitmap to a first value, wherein the bit of the bitmap having the first value indicates that the at least one logical address within the respective portion of the logical address space is stored within the block of memory cells, and wherein the bit of the bitmap having a second value indicates that no logical address within the respective portion of the logical address space is stored within the block of memory cells.

* * * * *